(12) United States Patent
Ding et al.

(10) Patent No.: US 12,462,395 B2
(45) Date of Patent: Nov. 4, 2025

(54) SIMULATING PROGRESSION OF SKIN CONDITIONS BASED ON MACHINE LEARNING

(71) Applicant: International Business Machines Corporation, Armonk, NY (US)

(72) Inventors: Yuan Yuan Ding, Shanghai (CN); Yi Chen Zhong, Shanghai (CN); Jing Zhang, Shanghai (CN); Yang Liu, Zhong Xin (CN); Ziyi Jiang, Shanghai (CN); Ting Ting Cao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 18/065,207

(22) Filed: Dec. 13, 2022

(65) Prior Publication Data

US 2024/0193787 A1    Jun. 13, 2024

(51) Int. Cl.
*G06T 7/136* (2017.01)
*G06T 5/70* (2024.01)

(52) U.S. Cl.
CPC .............. *G06T 7/136* (2017.01); *G06T 5/70* (2024.01); *G06T 2207/10024* (2013.01);
(Continued)

(58) Field of Classification Search
CPC . G06T 7/136; G06T 5/70; G06T 2207/10024; G06T 2207/20081; G06T 2207/30088; G06T 2207/30201; G06T 7/11; G06T 11/001; G06T 2200/24; G06T 7/002; G06T 7/33; G06T 7/90; G06T 3/4046; G06T 5/60; G06T 9/002; G06T 2207/20076; G06T 2207/20084;
(Continued)

(56) References Cited

U.S. PATENT DOCUMENTS 8,290,257 B2    10/2012    Demirli et al.
8,391,639 B2    3/2013    Hillebrand et al.
(Continued)

FOREIGN PATENT DOCUMENTS

CA    2711519 A1 *    7/2009    ............ A61B 5/0075
CN    101686819 B *    8/2014    ............. A61B 5/442
(Continued)

OTHER PUBLICATIONS

Laurence Boissieux et al., "Simulation of Skin Aging and Wrinkles with Cosmetics Insight," Computer Animation and Simulation 2000, Dated: Jan. 2000, pp. 1-14.
(Continued)

*Primary Examiner* — Jose L Couso
(74) *Attorney, Agent, or Firm* — Patterson + Sheridan, LLP

(57) ABSTRACT

Techniques for skin-condition visualization using machine learning. A color image depicting facial skin of a subject is retrieved. A monochromatic version of the color image is generated. Candidate instances of one or more skin conditions are segmented from the monochromatic version based on a segmentation threshold and using a machine learning model. A polarized version of the color image is generated, and based on the polarized version, the candidate instances are filtered. One or more simulation images are generated based on the filtered candidate instances.

20 Claims, 9 Drawing Sheets

(52) U.S. Cl.
CPC ............... *G06T 2207/20081* (2013.01); *G06T 2207/30088* (2013.01); *G06T 2207/30201* (2013.01)

(58) Field of Classification Search
CPC ....... A61B 5/442; A61B 5/444; A61B 5/7435; A61B 5/0064; A61B 5/441; A61B 5/0059; A61B 5/1032; A61B 5/445; A61B 5/411; A61B 5/446; A61B 5/7267; A61B 5/7425; G06V 10/56; G06V 10/507; G06V 40/169; G06V 40/171; G06V 2201/03; G06V 10/454; G06V 10/54; G06V 10/774; G06V 10/82; G06V 20/41; G06V 30/18057; G06V 20/698; G06V 30/19173; A45D 44/005; A01J 3/526; G06F 3/04847; G06F 18/214; G06F 18/22; G06F 18/241; G06F 18/24; G06F 18/2411; G06F 18/2415; G06Q 30/0631; G06N 3/02; G06N 3/08–088; G06N 3/0445; G06N 3/0454; G06N 3/4046; G06N 7/00; G06N 7/01; G06N 20/00; G06K 7/1482; Y10S 128/925
See application file for complete search history.

(56) References Cited

U.S. PATENT DOCUMENTS

| | | | |
|---|---|---|---|
| 2003/0065578 A1 | 4/2003 | Peyrelevade et al. | |
| 2005/0030372 A1* | 2/2005 | Jung .................... | A61B 5/0059 348/77 |
| 2009/0028380 A1* | 1/2009 | Hillebrand ................ | G06T 7/33 382/100 |
| 2009/0245603 A1* | 10/2009 | Koruga .................. | A61B 5/444 382/128 |
| 2010/0185064 A1* | 7/2010 | Bandic ................... | A61B 5/444 600/306 |
| 2011/0206254 A1* | 8/2011 | Patwardhan ......... | A61B 5/0077 382/128 |
| 2011/0301441 A1* | 12/2011 | Bandic ................. | A61B 5/4875 600/306 |
| 2017/0303790 A1* | 10/2017 | Bala .......................... | G06T 7/11 |
| 2020/0020011 A1* | 1/2020 | Harvill ............... | G06Q 30/0621 |
| 2020/0342594 A1* | 10/2020 | Dissanayake .......... | G16H 20/70 |
| 2021/0196186 A1* | 7/2021 | Yeates .................. | A61B 5/7485 |
| 2022/0148161 A1 | 5/2022 | Guo et al. | |

FOREIGN PATENT DOCUMENTS

| | | | | |
|---|---|---|---|---|
| EP | 1189536 B1 | | 3/2011 | |
| KR | 20100005072 A | * | 1/2010 | ......... G06Q 30/0631 |
| KR | 20210135580 A | * | 11/2021 | ........... G06V 40/171 |
| WO | WO-2013098512 A1 | * | 7/2013 | ........... A61B 5/7264 |

OTHER PUBLICATIONS

Victor Martin et al., "Face aging simulation with a new wrinkle oriented active appearance model," Multimedia Tools and Applications, vol. 78, Dated: Jul. 20, 2018, pp. 1-19.

J. Sourati et al., "Unsupervised Wrinkle Detection in Reflectance Confocal Microscopy Images of the Human Skin," Acoustics, Speech, and Signal Processing, 1988. ICASSP-88., 1988 International Conference, Dated: Mar. 2012, pp. 1-5.

Julie Robic et al., "Three-Dimensional Conditional Random Field for the Dermal-Epidermal Junction Segmentation," J Med Imaging (Bellingham), Dated Apr. 2019, pp. 1-11.

Bae et al., "Multimodal facial color imaging modality for objective analysis of skin lesions", Journal of Biomedical Optics, vol. 13, Issue 6, 064007, Nov. 1, 2008, 19 pages.

Shafaei et al., "AutoRetouch: Automatic Professional Face Retouching", 2021 IEEE Winter Conference on Applications of Computer Vision (WACV), Jan. 3-8, 2021, 09 pages, DOI: 10.1109/WACV48630.2021.00103.

\* cited by examiner

SIMULATING PROGRESSION OF SKIN CONDITIONS BASED ON MACHINE LEARNING

BACKGROUND

Embodiments presented in this disclosure relate to techniques for generating images using machine learning. More specifically, embodiments disclosed herein relate to techniques for generating images that simulate progression of skin conditions.

Machine learning algorithms can be trained to classify different medical conditions in medical imaging and related applications, such as identifying medical images with anomalies or diseases present in the medical images, and differentiating such medical images showing anomalies and diseases from normal medical images in which such anomalies are present. Such training often requires large sets of annotated or labeled medical images in order for the machine learning algorithm to reach convergence. Typical sources of medical images provide the medical images as unlabeled or non-annotated medical images.

SUMMARY

Embodiments presented in this disclosure provide a computer-implemented method, a computer program product, and a system to perform an operation of skin-condition visualization. The operation includes retrieving a color image depicting facial skin of a subject. The operation also includes generating a monochromatic version of the color image. The operation also includes segmenting, based on a segmentation threshold and using a machine learning model, candidate instances of one or more skin conditions from the filtered monochromatic version.

The operation also includes generating a polarized version of the color image. Based on the polarized version, the candidate instances are filtered to exclude at least one candidate instance such that one or more candidate instances remain as one or more finalized instances. The operation also includes generating, based on the one or more finalized instances, one or more simulation images. The one or more simulation images simulate an improving or worsening of the one or more finalized instances over time relative to the color image.

DETAILED DESCRIPTION

Figure 1:
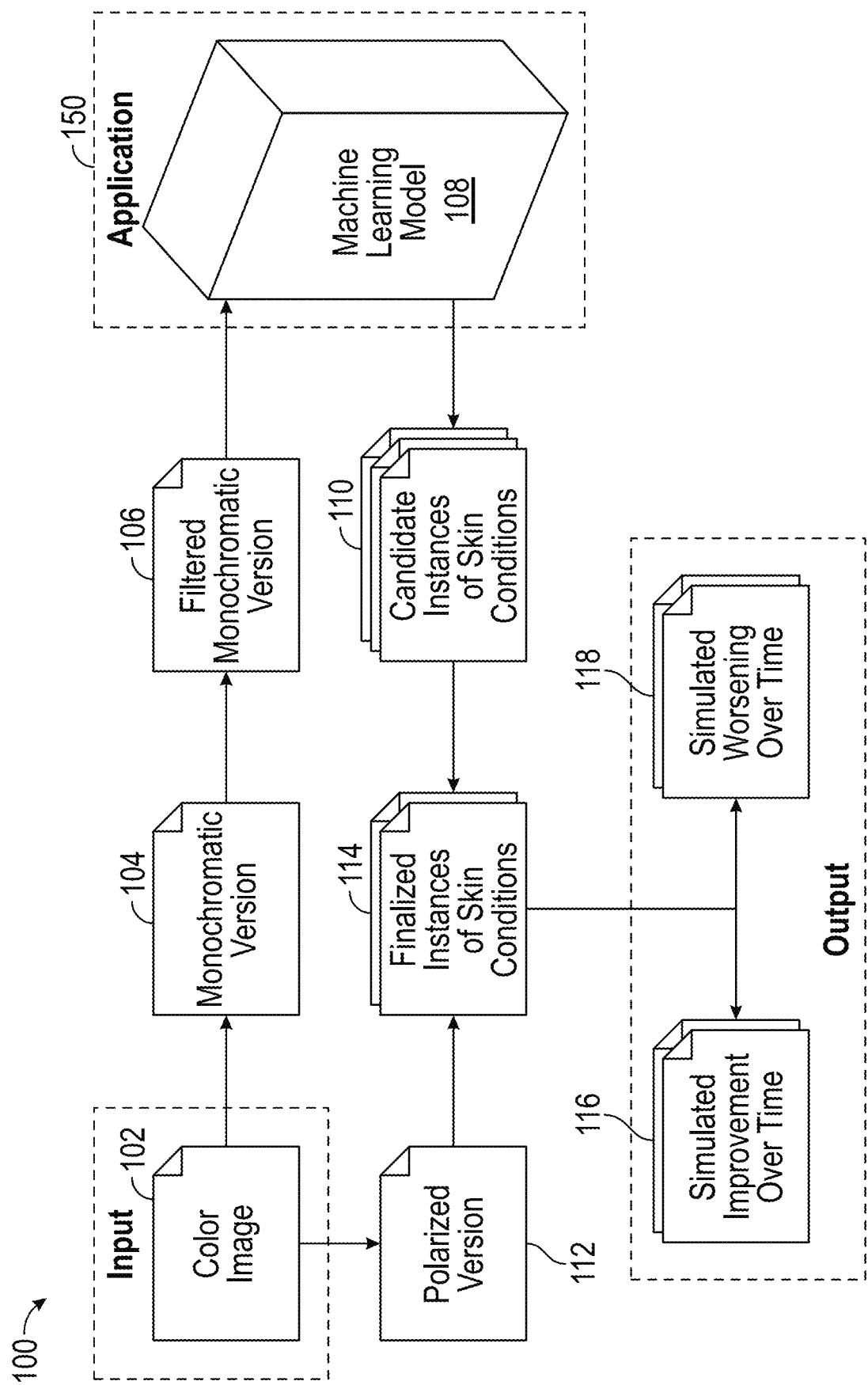
FIG. 1 is a data flow diagram for generating images that simulate progression of skin conditions, according to one embodiment presented in this disclosure.

Embodiments presented in this disclosure provide techniques of computer visualization using machine learning models to generate images that simulate progression of skin conditions of a subject over time. In the case of the subject being a first user, the images simulate: progression of skin conditions of the first user as the first user ages. Examples of skin conditions include spots, acne, and wrinkles, and depending on the embodiment, the skin conditions can include facial conditions or non-facial conditions. The images can be generated based on an input image depicting the skin conditions of the first user. Further, the images can be generated dynamically and/or in real time. Depending on the embodiment, the progression can be simulated in conjunction with or in lieu of simulating aging of facial regions free of skin conditions or otherwise free of certain skin conditions for which progression is desired to be simulated (although other skin conditions may still be present).

At least in some cases, the images generated using the techniques disclosed herein can simulate progression of skin conditions with a higher measure of accuracy and/or efficiency compared to alternative approaches. In this regard, at least in some embodiments, the images are generated using machine learning models that are trained using unsupervised learning, for which no segmentation labeling is required. As such, a processing overhead and a time delay associated with a supervised-learning phase can be avoided, and applicability to a broader range of use cases can be attained, e.g., use cases in which no labeling is available. Further, a level of effort, including user input, necessary to provide the labeling can also be avoided.

At least in some cases, the generated images can more accurately convey a simulated worsening and/or improving of skin conditions of the first user. In one embodiment, the generated images can be used to convey, with a higher measure of accuracy and/or effectiveness, simulated worsening of skin conditions of the user in an absence of a specified skincare product, treatment, or procedure. Additionally or alternatively, the generated images can be used to convey, with a higher measure of accuracy and/or effectiveness, simulated improving of skin conditions of the user assuming that the specified skincare product, treatment, or procedure is applied.

In some embodiments, the specified skincare product, treatment, or procedure is associated with recommended instructions for usage. In such cases, the generated images can also convey different measures of improvement and/or worsening of skin conditions based on a degree to which the recommended instructions are obeyed or disobeyed. For instance, a specified skin-whitening product may have associated instructions that recommend usage twice per day. The generated images can depict a greater degree of improvement assuming the skin-whitening product is applied twice per day and a lesser degree of improvement assuming the skin-whitening product is only applied three times per week.

In some embodiments, the generated images can be conveyed to the first user or to a different user who exhibits the same or similar skin characteristics. Additionally or alternatively, the generated images can be conveyed to a skincare or beauty professional or other representative to facilitate a more accurate recommendation to be made by the skincare professional to the user, where the recommendation can pertain to a specific product, treatment, or procedure.

In one embodiment, providing a dynamic analysis of skin conditions can lead to improved user experience and/or user satisfaction at least in some cases. For instance, the images generated using the techniques disclosed herein can simulate the appearance of the first user, either overall or only in terms of certain skin conditions, had the face or just the skin conditions of first user aged by an additional ten years. Some of the generated images can depict a scenario in which facial spots of the first user worsened in appearance over time. Additionally or alternatively, some of the generated images can depict a scenario in which facial spots of the first user improved in appearance over time. Based on the generated images, a representative at a beauty salon or other facility can recommend a particular skin-whitening product to the first user. At least in some embodiments, the input image can be captured at the beauty salon or at an associated facility, and the simulated images can be generated during the same visit.

Further, in certain embodiments, the generated images can be applied by a physician in a medical context to determine medical treatment plans for a patient, thereby causing a particular treatment or prophylaxis to be effected for managing the progression of skin conditions, including slowing or reversing the progression in some cases. For example, when treating a user as a patient, the physician having the simulated images can prescribe certain topical medication with a greater measure of accuracy than in an absence of the simulated images. Depending on the embodiment, the topical medication can include prescription topical medication or non-prescription topical medication.

In one embodiment, the techniques disclosed herein can overcome limitations of alternative approaches. Some of the alternative approaches process all facial features of a user without any operations that are tailored to specific conditions, e.g., spots or acne; in other words, the facial features are processed indiscriminately. As a result, such alternative approaches cannot simulate improvement or worsening in a tailored manner, e.g., in a manner in which improvement or worsening is simulated only in regions containing the specific conditions and not in other regions of the color image. Such tailored simulation can be desired to convey improvement or worsening of instances of skin conditions that are present only in specific facial regions of the first user. At least in some cases, such tailored simulation can also avoid a computational overhead associated with simulating the other regions of the color image, thereby increasing a measure of efficiency with which progression of the skin conditions is simulated.

Examples of the alternative approaches that indiscriminately process facial features include retouching and facial-aging simulations. Additionally or alternatively, many of the alternative approaches are implemented based on a generative adversarial network (GAN), in which a generative neural network generates candidates that are evaluated by a discriminative neural network and in which the generative neural network is trained to increase an error rate of the discriminative neural network. The generative neural network can be a deconvolutional neural network, while the discriminative neural network can be a convolutional neural network.

In one embodiment, the techniques disclosed herein can overcome some or all of certain limitations of GANs at least in some cases. The limitations can include a substantial amount of training images and labels being needed, limited interpretability of the GANs, overreliance on deconvolutional and convoluntional neural networks alone for accuracy of the generated images, inability to perform targeted improvement or worsening of desired skin conditions such as spots or acne, and/or inability to customize a desired measure of improvement or worsening.

In certain embodiments, however, one or more of the alternative approaches can be used to simulate aging of facial regions free of skin conditions altogether or free of specified skin conditions; in such embodiments, the alternative approaches are only applied to the such facial regions and are not applied to other facial regions that do contain the specified skin conditions.

FIG. 1 is a data flow diagram 100 for generating images that simulate progression of skin conditions, according to one embodiment. As shown, an application 150 includes a machine learning model 108 and generates, as output, images that simulating an improving and/or worsening of one or more skin conditions over time. To that end, the application 150 takes as input a color image 102 depicting facial skin of a subject and, at least in some embodiments, generates one or more intermediate products. As further described herein, the one or more intermediate products can be intermediate images, and at least some of the intermediate images can be image masks.

In one embodiment, the application 150 generates a monochromatic version 104 of the color image 102. In some embodiments, the monochromatic version 104 can be a sepia version of the color image 102 or a grayscale version of the color image 102. The application 150 then generates a filtered version 106 of the monochromatic version 104 by filtering the monochromatic version 104 to remove noise. The application 150 then determines a segmentation threshold for the filtered, monochromatic version 106. In some embodiments, the segmentation threshold is determined using Otsu's method. Otsu's method refers to an image processing technique for determining an intensity threshold that separates pixels of an image into foreground and background, where the intensity threshold is determined by minimizing intra-class intensity variance or maximizing inter-class intensity variance.

In one embodiment, the application 150 then performs an operation to segment, based on the segmentation threshold and using a machine learning model, candidate instances 110 of one or more skin conditions from the filtered monochromatic version. This operation is further described herein as segmentation optimization. In some embodiments, the machine learning model includes a conditional random field (CRF). A CRF refers to a graphical model in which both predictions and dependencies between the predictions are modeled. Further, the candidate instances 110 can be generated using unsupervised learning, for which no segmentation labeling is required.

In one embodiment, the application 150 then generates a polarized version 112 of the color image 102. The application 150 then filters the candidate instances 110 based on the polarized version 112 and to generate finalized instances 114 of the one or more skin conditions. In one embodiment, the candidate instances are represented in the form of a first image mask, and the finalized instances are represented in the form of a second image mask. Each of the first and second image masks is generated based on the filtered monochromatic version and the segmentation threshold.

In some embodiments, the candidate instances 110 are filtered based further on one or more predefined rules. In some embodiments, in generating the finalized instances 114, at least one candidate instance of the candidate instances 110 is excluded, by the filtering and from subsequent simulation, as being a facial feature rather a skin condition. Additionally or alternatively, a candidate instance can also be excluded, by the filtering and from subsequent simulation, as being of a type of skin condition that does not correspond of any in a set of desired types of skin conditions being targeted by the simulation.

In some embodiments, excluding candidate instances from simulation can preclude subsequently generated images from simulating progression of facial features and/or certain types of skin conditions. This outcome can be desirable in scenarios involving types of skin conditions not targeted by a specified skincare product. For instance, an anti-wrinkle cream may not be effective in improving moles in terms of esthetics. As a result, the subsequently generated images can simulate progression of certain skin conditions while not simulating any progression of other skin conditions and/or facial features. That is, the other skin conditions and/or facial features can appear at least largely unchanged in appearance across some or all of the generated images. Doing so can also avoid a processing overhead associated with simulating progression of the other skin conditions and/or facial features at least in some cases, resulting in an increased measure of efficiency of simulating the progression of the certain skin conditions.

In one embodiment, the application 150 then generates, as output and based on the finalized instances 114, one or more simulation images 116, 118 that simulate an improving or worsening, respectively, of the filtered candidate instances over time relative to the color image 102. Depending on the embodiment, the output can be generated based further on at least one of the color image 102, the monochromatic version 104, and the polarized version 112. At least in some embodiments, simulating the improving or worsening of the filtered candidate instances is not based on any machine learning model, although in other embodiments, a machine learning model can be used. In some embodiments, the improving is simulated using a repair operation based on pixel similarity. In one embodiment, the repair operation includes adjusting a color value or color disparity of a specified image region containing a facial spot, where the adjusting is based on neighboring pixels of the specified image region. The repair operation can also be referred to as an adaptive-repair operation, according to one embodiment.

Additionally or alternatively, in some embodiments, the worsening is simulated using a region-filling operation. In one embodiment, the region-filling operation includes extracting, from the monochromatic version, image regions containing facial spots, superimposing the extracted image regions onto the polarized version, and applying a desired measure of simulated improvement or worsening to the facial spots as depicted in the extracted image regions. In some embodiments, the desired measure is applied using one or more Gaussian functions. Additionally or alternatively, the desired measure for a given facial spot can be determined and/or adjusted based on a weight associated with the image region containing the given facial spot in the monochromatic version. In some embodiments, the weight is determined based on user input specifying a desired value for the weight, and the desired value can be tailored to suit the needs of a particular case.

Figure 2:
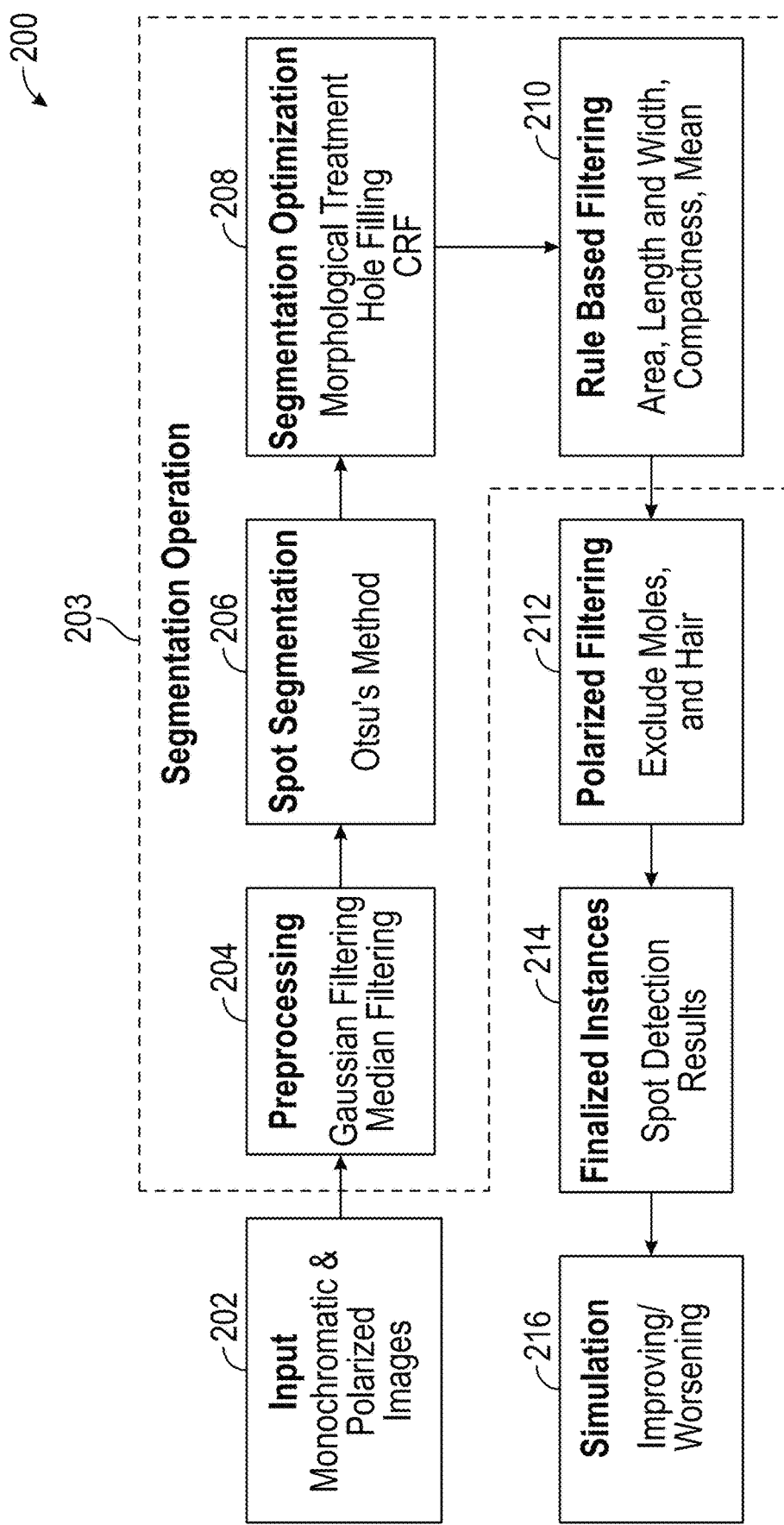
FIG. 2 is a depiction of execution stages of a sample implementation of an application for generating images that simulate progression of skin conditions, according to one embodiment presented in this disclosure.

FIG. 2 is a depiction of execution stages 200 of a sample implementation of the application for generating images that simulate progression of skin conditions, according to one embodiment. In one embodiment, the application can be the application 150 of FIG. 1. As shown, the execution stages 200 take, as input 202, monochromatic and polarized versions of a color image. The execution stages 200 include a first execution stage 204 that entails preprocessing for noise reduction. In some embodiments, a filtering operation, such as Gaussian filtering and/or median filtering, can be performed as part of the preprocessing. The execution stages 200 include a second execution stage 206 that entails spot segmentation. In some embodiments, the spot segmentation is based on Otsu's method.

The execution stages 200 include a third execution stage 208 that entails segmentation optimization. In some embodiments, the segmentation optimization includes morphological operations and/or hole-filling operations. In one embodiment, the morphological operations are used to determine image regions containing an instance of a skin condition such as a spot. The morphological operations are morphological image processing operations configured to process an input image based on shapes of features depicted in the input image, according to one embodiment. Examples of the morphological operations include grayscale conversion, image smoothing, Gaussian filtering, and connected-region detection. The hole-filling operations are configured to fill image regions identified as containing holes, according to one embodiment. The image regions can be identified and/or filled based on one or more conditional rules, at least in some embodiments.

In some embodiments, the segmentation optimization can be based on a machine learning model, e.g., a CRF. Performing the spot segmentation and the segmentation optimization generates segmentation results, according to one embodiment. The segmentation results can include one or more segments, each segment corresponding to a skin condition, e.g., a facial spot of a user. Collectively, the first, second, third, and fourth execution stages 204, 206, 208, 210 can constitute part or all of a predefined segmentation operation 203, in some embodiments.

In one embodiment, the execution stages 200 include a fourth execution stage 210 that entails one or more rule-based filtering operations. The one or more rule-based filtering operations can perform filtering based on specified criteria pertaining to the segmentation results, such as segment area, segment length and/or width, segment compactness, segment mean, etc. The execution stages 200 include a fifth execution stage, polarized filtering 212, that entails filtering based on the polarized image.

In some embodiments, the filtering based on the polarized image can exclude, from subsequent simulation, facial features and or specified types of skin conditions. For example, the filtering based on the polarized image can exclude hair, moles, tattoos, and piercings from simulation. The filtering based on the polarized image can generate finalized instances 214, which can include spot-detection results, for instance. The execution stages 200 include a sixth execution stage that entails simulation 216. In some embodiments, the simulation 216 generates images that simulate improvement and/or worsening of skin conditions over time.

Figure 3:
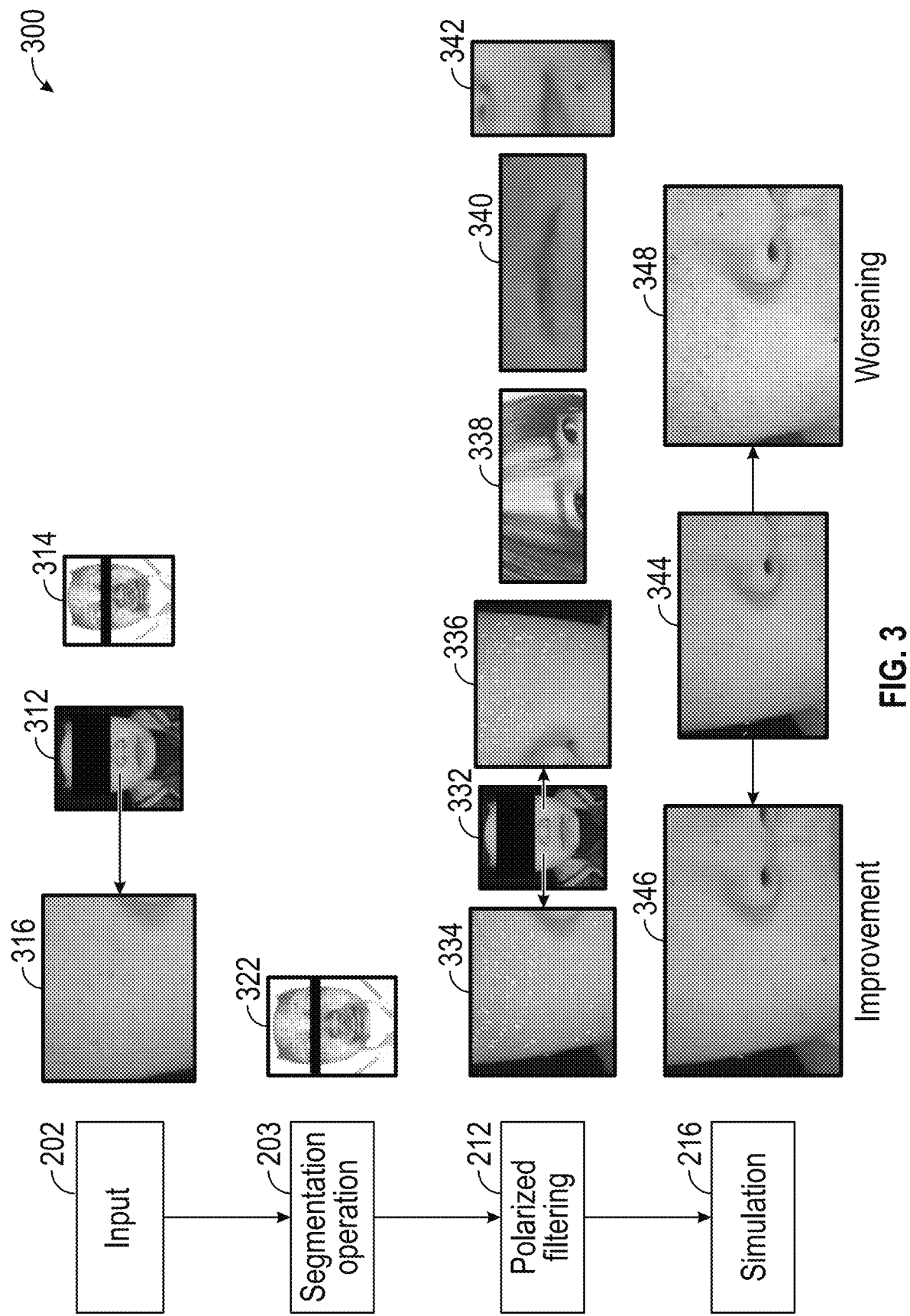
FIG. 3 depicts sample images corresponding to certain execution stages of the sample implementation of the application for generating images that simulate progression of skin conditions, according to one embodiment presented in this disclosure.

FIG. 3 depicts sample images corresponding to execution stages 300 of the sample implementation of the application for generating images that simulate progression of skin conditions, according to one embodiment. As shown, the execution stages 300 take the input 202 as input and include the segmentation operation 203, the polarized filtering 212, and the simulation 216. For instance, the input 202 can include a polarized version 312 and a monochromatic version 314 of a color image depicting skin conditions of a user. The sample images include an image 316 providing a zoomed-in view of the skin conditions depicted in the color image. The segmentation operation 203 identifies one or more segments based on the monochromatic version 314, each segment corresponding to an instance of a skin condition depicted in the color image. The sample images include an image 322 depicting segments identified by the segmentation operation 203.

The sample images also include images depicting facial features or certain skin conditions identified, by the polarized filtering 212, for exclusion. Such images include a first image 338 depicting hair, a second image 340 depicting an eyebrow, and a third image 342 depicting a mole. The sample images also include an image 332 depicting finalized instances of skin conditions depicted in the color image and images 334, 336 providing zoomed-in views of the finalized instances. The finalized instances are generated by the polarized filtering 212, according to one embodiment. In addition, the sample images include output generated by the simulation 216. As shown, the output includes an image 346 depicting a simulated improvement of skin conditions depicted in the color image, an image 348 depicting a simulated worsening of the skin conditions depicted in the color image, and an image 344 providing a zoomed-in view of the skin conditions depicted in the color image.

Figure 4A:
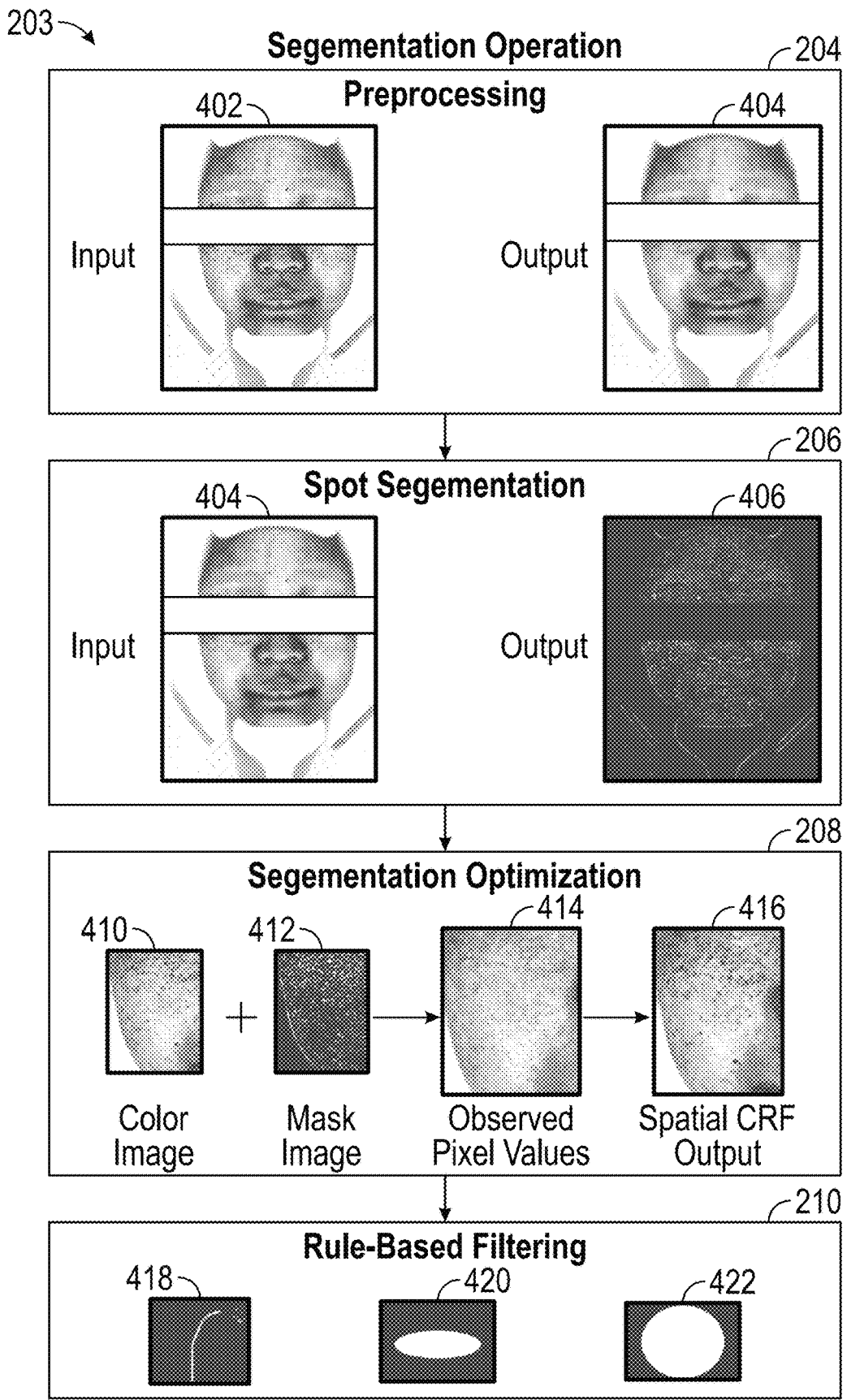
FIGS. 4A-4B depict sample images corresponding to certain execution stages of the sample implementation of the application for generating images that simulate progression of skin conditions, according to one embodiment presented in this disclosure.
Figure 4B:
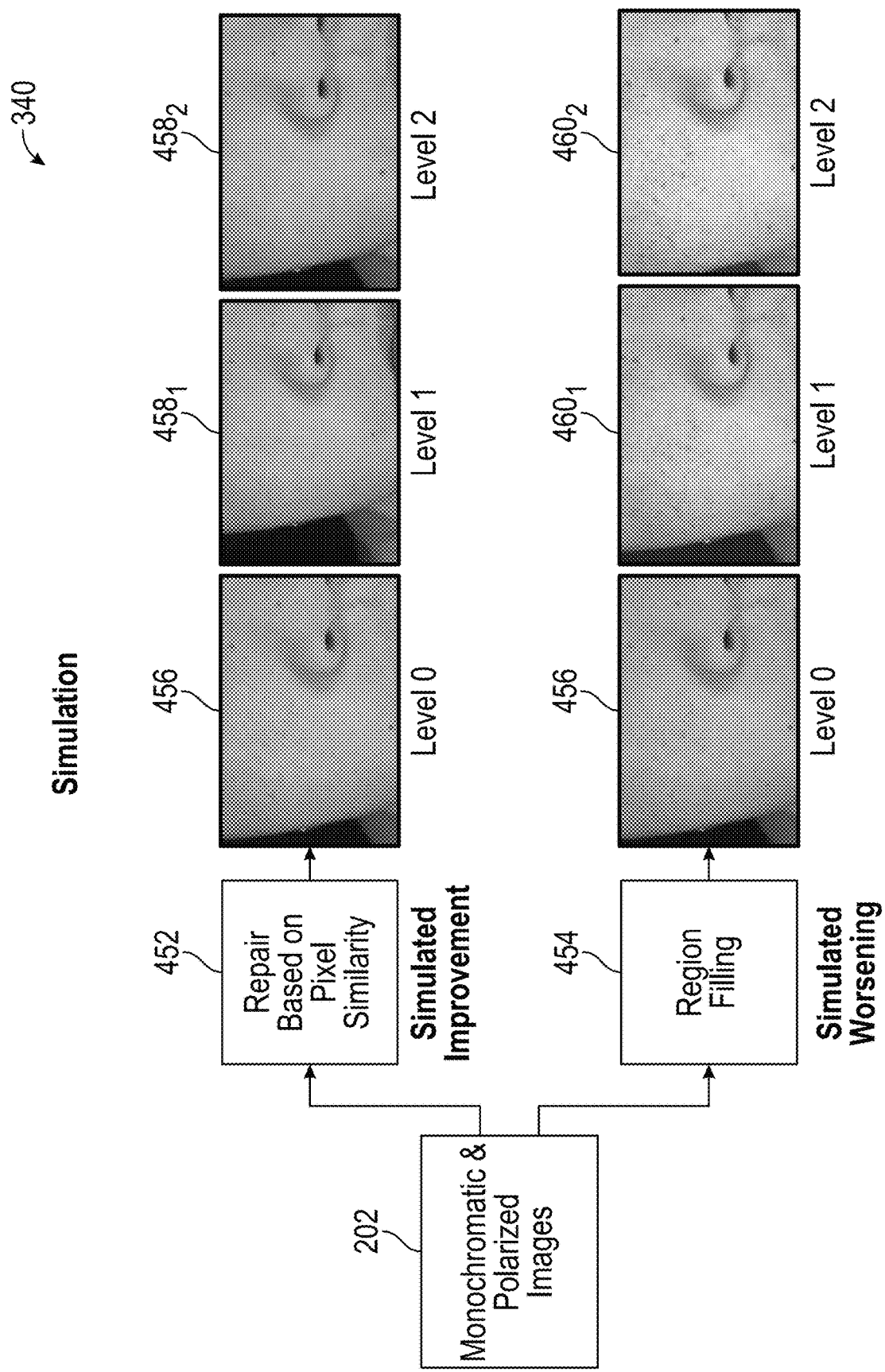

FIGS. 4A-4B depict sample images corresponding to certain execution stages of the sample implementation of the application for generating images that simulate progression of skin conditions, according to one embodiment. As shown in FIG. 4A, the segmentation operation 203 includes the preprocessing 204, the spot segmentation 206, the segmentation optimization 208, and the rule-based filtering 210. The preprocessing 204 takes a monochromatic image 402 as input and generates a filtered image 404 as output. In some embodiments, the filtered image 404 reflects a reduction or removal of noise present in the monochromatic image 402. Further, in some embodiments, the filtered image 404 can undergo a conversion into a format more suited for subsequent operations; in the particular example shown, the monochromatic image 402 is a sepia image, while the filtered image 404 is a grayscale image. Put another way, the sepia version can be more suited for the preprocessing 204, while the grayscale version can be more suited for subsequent operations. In other embodiments, however, the filtered image 404 does not undergo any conversion into a different format but can retain its original format, e.g., as a sepia image.

In one embodiment, the spot segmentation 206 takes the filtered image 404 as input and generates an image mask 406 as output. In some embodiments, the spot segmentation 206 includes determining a segmentation threshold for the filtered image 404, and the segmentation threshold is determined using Otsu's method. The segmentation optimization 208 identifies segments, which are candidate instances of skin conditions from the filtered image 404, according to one embodiment.

In some embodiments, the machine learning model includes a CRF having associated input variables that include pixel values of an input image and further having associated target variables that include a respective classification of each pixel value. Each classification can be selected from a set of predefined classifications, e.g., facial spot, facial acne, etc. The CRF is configured to capture dependencies between pixel values, and the dependencies are represented as edges in the CRF while pixels are represented as nodes. In some embodiments, the CRF is a fully connected CRF, which contains edges reflecting that each pixel is connected to each other pixel. The fully connected CRF can be characterized by a Gibbs measure, which gives a probability of a random variable x having value X, as specified in the equation:

$$P(x = X \mid I) = \frac{1}{Z(I)} e^{-E(X|I)}.$$

In the equation, x represents a respective, observable value for each pixel of an input image to the CRF. Further, X specifies whether the respective pixel belongs to a particular instance of a classification (e.g., a spot). I represents a classification of whether the pixel value belongs to a true value of the particular instance of the classification (e.g., the spot). The classification can be conveyed in the form a label. Further still, Z(I) is a partition function of I that serves as a normalizing constant, and E(X|I) is an energy function of X given I. In some embodiments, the number of instances of the variable x can be proportional to the image attributes of an input image to the CRF, and the image attributes can include image size and/or image resolution.

At least in some embodiments, however, the computation overhead in using a fully connected CRF can increase exponentially as the image size increases. Further, because each pixel is processed, the fully connected CRF is susceptible to noise in the image, and as a result, the noise can lead to errors in segmentation, e.g., false positives and/or false negatives. In one embodiment, to overcome these limitations, rather than taking the variable x from the color image or its monochromatic or polarized version, the variable x is taken from the output of the filtering based on Otsu's method, where the output is the filtered, monochromatic version of the color image. In other words, only the pixels corresponding to the image mask are accepted as true, observed values. This approach of using a CRF in a modified manner of taking the variable x from the filtered, monochromatic version can be referred to as a spatial-CRF approach, and the CRF used in this manner can be referred to as a spatial CRF. Doing so can reduce a computational overhead while pre-filtering additional noise in some cases, at least when compared to alternative, unmodified approaches of using a CRF. As a result, a measure of efficiency with which the progression of certain skin conditions is simulated can be increased.

Accordingly, the sample images include an image 414 is used as input to the CRF, where the image 414 is generated based on a color image 410 and an image mask 412. Based on the image 414, the CRF generates an output that specifies candidate instances of skin conditions, according to one embodiment. As shown, the output can be represented in the form of an image 416 reflecting the candidate instances of skin conditions. In one embodiment, the image 416 is an image mask.

In one embodiment, the rule-based filtering 210 evaluates whether each of the identified segments satisfies filtering criteria specified in filtering rules and, if so, excludes the respective segment from simulation. The filtering rules can be predefined based on information regarding characteristics of skin conditions, the information including current and/or historical information.

To illustrate, the sample images include an image 418 depicting a first segment excluded by the rule-based filtering 210 as, per a first filtering rule, not being a spot, due to not being round in shape. The sample images also include an image 420 depicting a second segment excluded by the rule-based filtering 210 as, per a second filtering rule, not being a spot, due to, depending on the embodiment, having a length exceeding a threshold length or having a length-to-width ratio exceeding a threshold ratio. The sample images also include an image 422 depicting a third segment excluded by the rule-based filtering 210 as, per a third filtering rule, not being a spot, due to having a size exceeding a threshold size. In one embodiment, the threshold size can be represented in the form of a specified number of pixels for a given image resolution.

As shown in FIG. 4B, the monochromatic and polarized images 202 corresponding to the color image can be used, along with the remaining segments after the rule-based filtering 210 is performed, as inputs for the simulation 340. In one embodiment, the simulation 340 can include a simulated improvement 452 and/or a simulated worsening 454, over time, of skin conditions depicted in the color image. The remaining segments constitute the finalized instances of skin conditions, in some embodiments.

The simulated improvement 452 can include a repair operation based on pixel similarity, while the simulated worsening 454 can include a region-filling operation. The sample images include the color image 456, a simulated image $458_1$ depicting a first level of improvement, and a simulated image $458_2$ depicting a second level of improvement. The sample images also include a simulated image $460_1$ depicting a first level of worsening, and a simulated image $460_2$ depicting a second level of worsening.

In some embodiments, the first level of improvement or worsening can characterize a level of improvement or worsening after a first specified period of time, e.g., six months, has elapsed since a time that the color image was captured. The second level of improvement or worsening can characterize a level of improvement or worsening after a second specified period of time, e.g., twelve months, has elapsed since the time that the color image was captured, where the second specified period of time is greater in duration than the first specified period of time.

As shown, each additional level of improvement or worsening represents a progressively greater measure of improvement or worsening as depicted in the respective, simulated image associated with the respective additional level of improvement. Although FIG. 4B is described with reference to two levels of improvement or worsening, any number of levels of improvement or worsening is broadly contemplated, including numbers greater or less than two.

Figure 5:
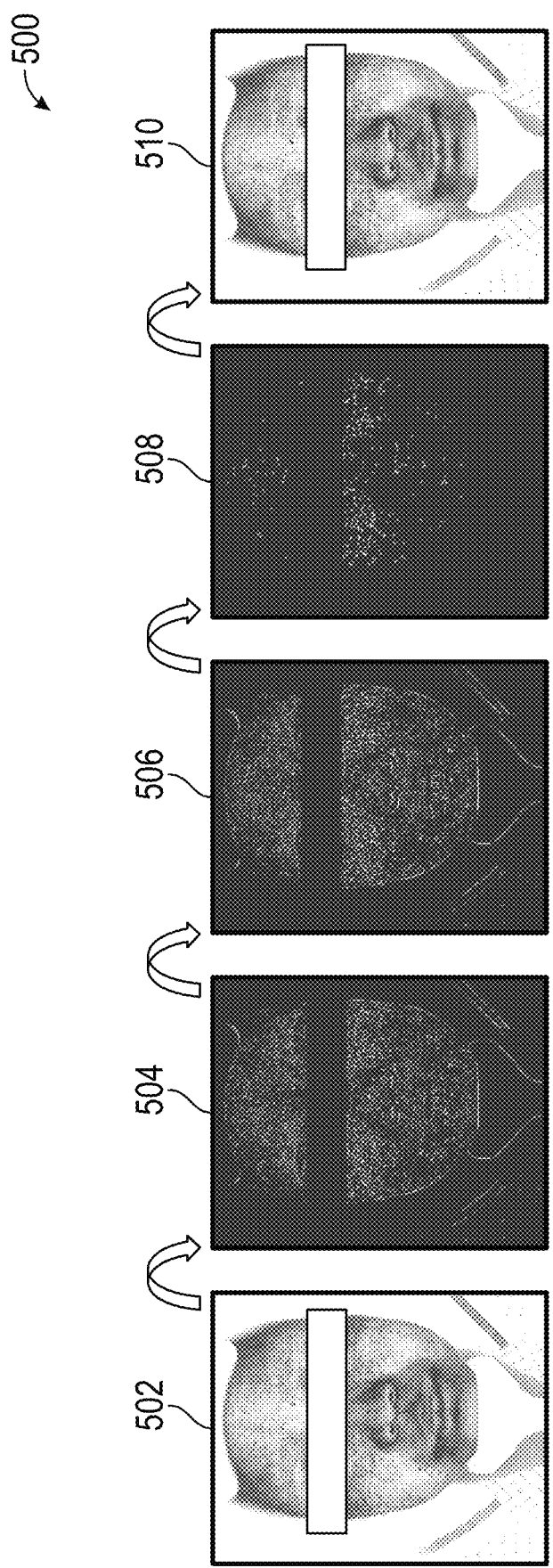
FIG. 5 depicts sample images corresponding to certain execution stages of the sample implementation of the application for generating images that simulate progression of skin conditions, according to one embodiment presented in this disclosure.

FIG. 5 depicts sample images corresponding to certain execution stages of the sample implementation of the application for generating images that simulate progression of skin conditions, according to one embodiment. As shown, the sample images include a monochromatic version 502 of a color image and a first image mask 504 generated after the preprocessing 204, spot segmentation 206, and segmentation optimization 208 of FIG. 2. The samples image also include a second image mask 506 generated after the rule-based filtering 210 of FIG. 2. The sample imagers also include a third image mask 508 generated after the polarized filtering 212 of FIG. 2.

As shown, the first, second, and third image masks 504, 506, 508 specify successively fewer instances of specific skin conditions whose progression is to be simulated. The sample images also include an image 510 that conveys the finalized instances of skin conditions. In the particular example shown, the image 510 is generated based on the third image mask 508 and the monochromatic version 502. In other embodiments, the image 510 can be generated based on other image versions, e.g., the color image and/or the polarized version, in lieu of, or in addition to, the monochromatic version 502.

Figure 6:
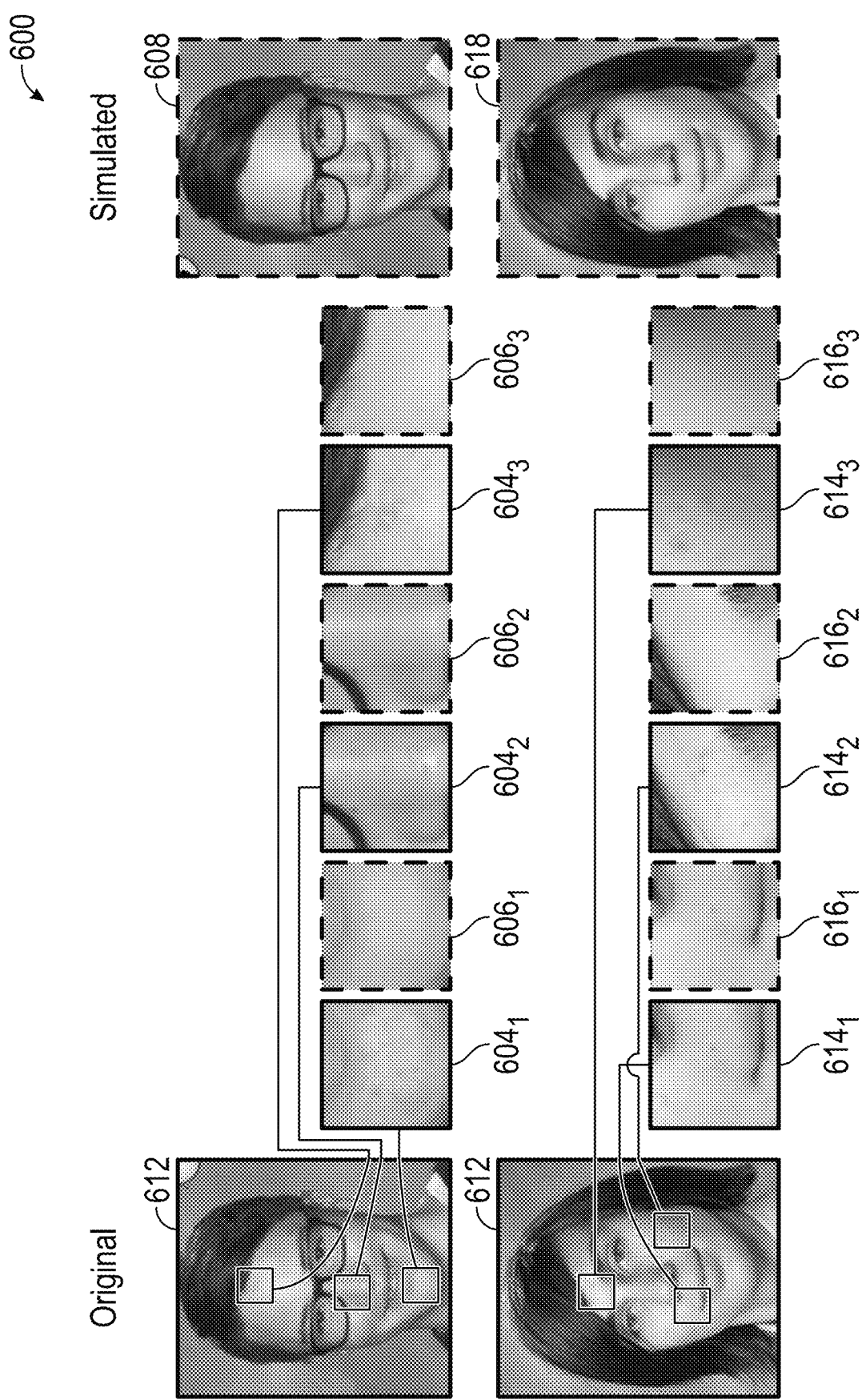
FIG. 6 depicts sample input, intermediate, and output images associated with an application for generating images that simulate progression of skin conditions, according to one embodiment presented in this disclosure.

FIG. 6 is a depiction 600 of sample input, intermediate, and output images associated with an application for generating images that simulate progression of skin conditions, according to one embodiment. As shown, the sample input images include an input image 602 depicting a first user and an input image 612 depicting a second user. Using the techniques described herein, the application can generate the sample intermediate images based on the sample input images. The sample intermediate images include, for the first user, intermediate images $604_{1-3}$ depicting skin conditions of the first user and, for the second user, intermediate images $614_{1-3}$ depicting skin conditions of the second user. At least in some embodiments, the intermediate images $604_{1-2}$, $614_{1-3}$ correspond to the finalized instances 214 of FIG. 2.

In one embodiment, the sample intermediate images also include, for each of the intermediate images $604_{1-2}$, $614_{1-3}$, a corresponding image simulating a certain progression—in this case, improvement—of the skin conditions, the corresponding image being selected from intermediate images $606_{1-3}$, $616_{1-3}$. The application can then generate the sample output images based on the input images 602, 612 and the intermediate images $606_{1-3}$, $616_{1-3}$. For instance, the same output images can be generated via a compositing operation that superimposes the intermediate images $606_{1-3}$, $616_{1-3}$ at corresponding positions atop the input images 602, 612. As shown, the sample output images include an output image 608 for the first user and an output image 618 for the second user.

Figure 7:
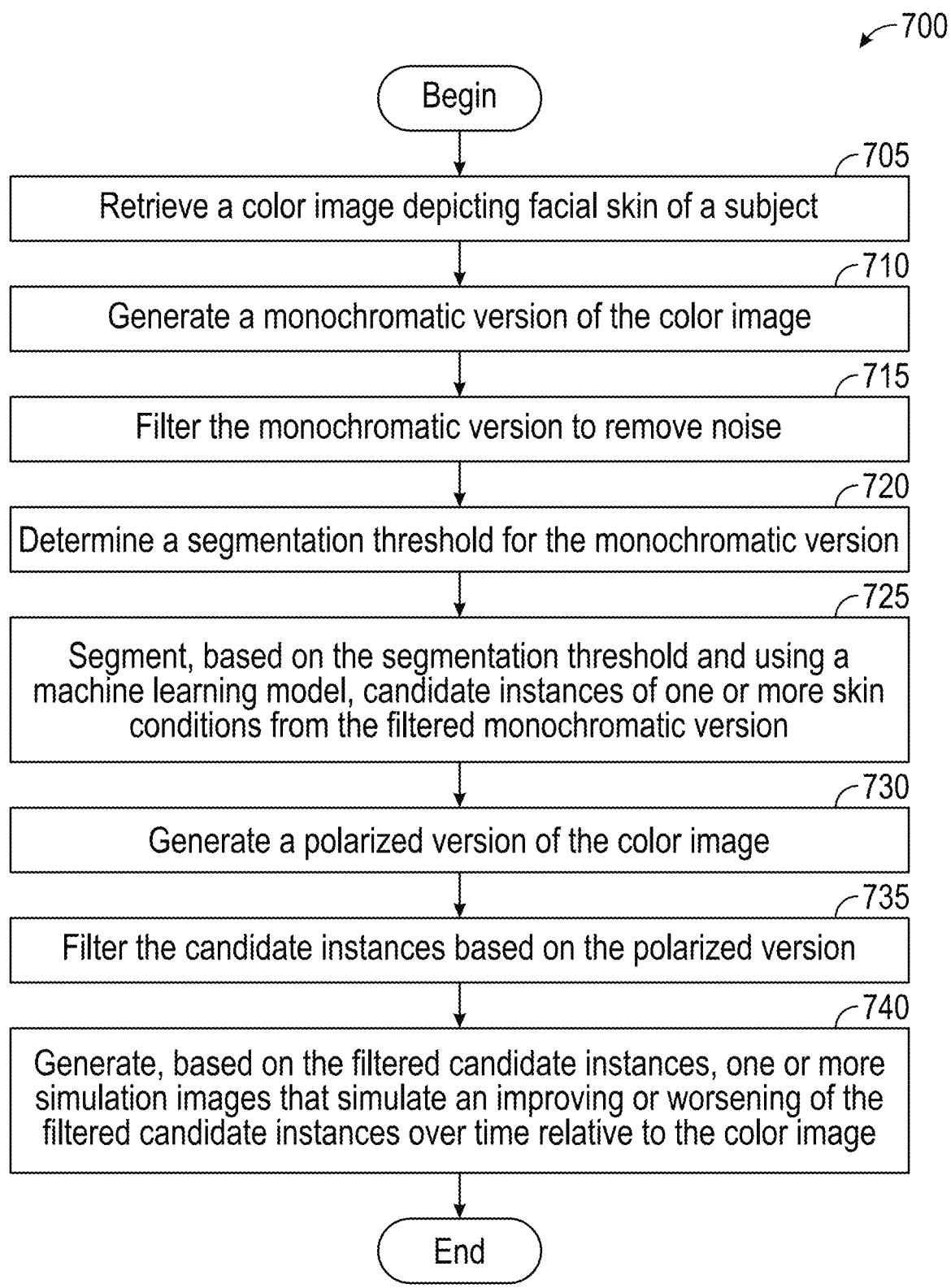
FIG. 7 is a flowchart depicting a method for generating images that simulate progression of skin conditions, according to one embodiment presented in this disclosure.

FIG. 7 is a flowchart depicting a method 700 for generating images that simulate progression of skin conditions, according to one embodiment. The method 700 can be performed by the application 150 of FIG. 1. As shown, the method 700 begins at step 705, where the application 150 retrieves a color image depicting facial skin of a subject. At step 710, the application 150 generates a monochromatic version of the color image. In some embodiments, the monochromatic version can be a sepia version of the color image or a grayscale version of the color image. At step 715, the application 150 filters the monochromatic version to remove noise. At step 720, the application 150 determines a segmentation threshold for the monochromatic version. In some embodiments, the segmentation threshold is determined using Otsu's method.

At step 725, the application 150 segments, based on the segmentation threshold and using a machine learning model, candidate instances of one or more skin conditions from the filtered monochromatic version. In some embodiments, the machine learning model includes a CRF. The candidate instances are generated using unsupervised learning, for which no segmentation labeling is required, according to one embodiment. At step 730, the application 150 generates a polarized version of the color image. At step 735, the application 150 filters the candidate instances based on the polarized version. In some embodiments, the candidate instances are filtered based further on one or more predefined rules. In some embodiments, at least one candidate instance is excluded, by the filtering, as being a least one facial feature rather than being at least one instance of the one or more skin conditions.

At step 740, the application 150 generates, based on the filtered candidate instances, one or more simulation images that simulate an improving or worsening of the filtered candidate instances over time relative to the color image. In some embodiments, the improving is simulated using a repair operation based on pixel similarity. Additionally or alternatively, in some embodiments, the worsening is simulated using a region-filling operation. After the step 740, the method 700 terminates.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
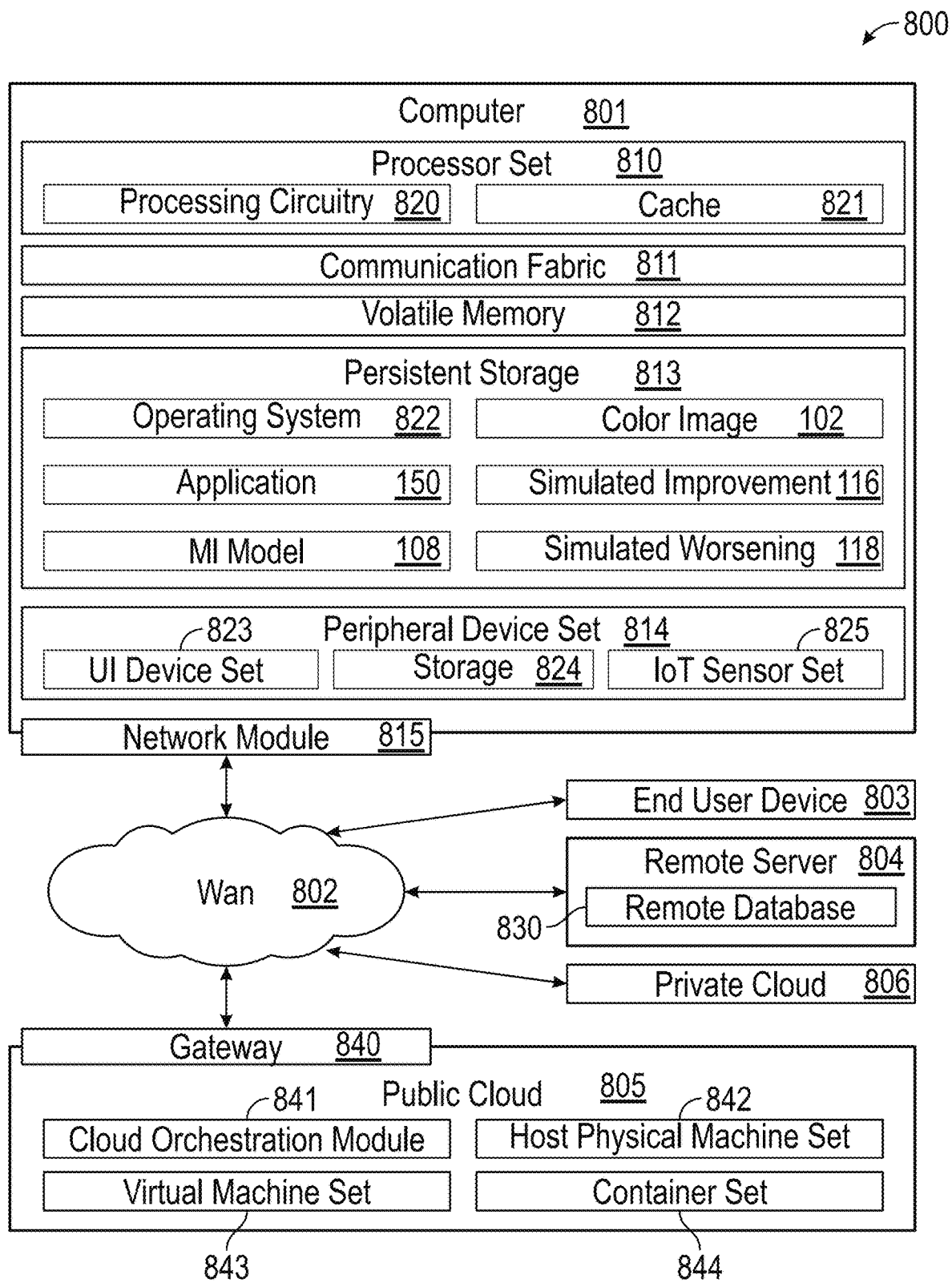
FIG. 8 is a block diagram illustrating components of a computing environment for generating images that simulate progression of skin conditions, according to one embodiment presented in this disclosure.

FIG. 8 is a block diagram illustrating components of a computing environment 800 for generating images that simulate progression of skin conditions, according to one embodiment. Computing environment 800 contains an example of an environment for the execution of at least some of the computer code involved in performing the inventive methods, such as the block 150, which represents the application for generating images that simulate progression of skin conditions, according to one embodiment. In addition to block 150, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 150, as identified above), peripheral device set 814 (including user interface (UI) device set 823, storage 824, and Internet of Things (IOT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible.

Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 150 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

While the foregoing is directed to embodiments of the present invention, other and further embodiments of the invention may be devised without departing from the basic scope thereof, and the scope thereof is determined by the claims that follow.

What is claimed is:

1. A computer-implemented method of skin-condition visualization, the computer-implemented method comprising:
retrieving a color image depicting facial skin of a subject;
generating a monochromatic version of the color image;
segmenting, based on a segmentation threshold and using a machine learning model, a plurality of candidate instances of one or more skin conditions from the monochromatic version;
generating a polarized version of the color image, wherein based on the polarized version, the plurality of candidate instances is filtered to exclude at least one candidate instance such that one or more candidate instances remain as one or more finalized instances; and
generating, based on the one or more finalized instances and by operation of one or more computer processors, one or more simulation images that simulate an improving or worsening of the one or more finalized instances over time relative to the color image.

2. The computer-implemented method of claim 1, wherein the one or more simulation images are generated based further on at least one of the polarized version, the monochromatic version, and the color image.

3. The computer-implemented method of claim 1, further comprising, prior to determining the segmentation threshold:
filtering the monochromatic version to remove noise.

4. The computer-implemented method of claim 1, wherein the monochromatic version comprises a sepia version of the color image or a grayscale version of the color image.

5. The computer-implemented method of claim 1, wherein the segmentation threshold is determined using Otsu's method, and wherein the machine learning model comprises a conditional random field (CRF).

6. The computer-implemented method of claim 1, wherein the plurality of candidate instances is generated using unsupervised learning and without requiring segmentation labeling.

7. The computer-implemented method of claim 1, wherein the improving is simulated using a repair operation based on pixel similarity, and wherein the worsening is simulated using a region-filling operation.

8. The computer-implemented method of claim 1, wherein the one or more simulation images are generated based further on the polarized version, the monochromatic version, and the color image, wherein the monochromatic version comprises a sepia version of the color image, wherein the segmentation threshold is determined using Otsu's method, wherein the machine learning model comprises a conditional random field (CRF), and wherein the computer-implemented method further comprises, prior to determining the segmentation threshold, filtering the monochromatic version to remove noise.

9. The computer-implemented method of claim 8, wherein the plurality of candidate instances is generated using unsupervised learning and without requiring segmentation labeling, wherein the plurality of candidate instances is represented as a first image mask, wherein the one or more finalized instances are represented as a second image mask, wherein the improving is simulated using a repair operation based on pixel similarity, wherein the worsening is simulated using a region-filling operation, wherein the plurality of candidate instances is filtered based further on one or more predefined rules, and wherein the subject comprises a user.

10. The computer-implemented method of claim 9, wherein a plurality of candidate instances, including the at least one candidate instance, is excluded, the plurality of candidate instances including a first candidate instance excluded as being a facial feature rather than being at least one instance of the one or more skin conditions, the plurality of candidate instances including a second candidate instance excluded as being an instance of a skin condition other than any of the one or more skin conditions.

11. A computer program product of skin-condition visualization, the computer program product comprising:
a computer-readable storage medium having computer-readable program code embodied therewith, the computer-readable program code executable by one or more computer processors to perform an operation comprising:
retrieving a color image depicting facial skin of a subject;
generating a monochromatic version of the color image;
segmenting, based on a segmentation threshold and using a machine learning model, a plurality of candidate instances of one or more skin conditions from the monochromatic version;
generating a polarized version of the color image, wherein based on the polarized version, the plurality of candidate instances is filtered to exclude at least one candidate instance such that one or more candidate instances remain as one or more finalized instances; and
generating, based on the one or more finalized instances, one or more simulation images that simulate an improving or worsening of the one or more finalized instances over time relative to the color image.

12. The computer program product of claim 11, wherein the one or more simulation images are generated based further on at least one of the polarized version, the monochromatic version, and the color image.

13. The computer program product of claim 11, the operation further comprising, prior to determining the segmentation threshold:
filtering the monochromatic version to remove noise.

14. The computer program product of claim 11, wherein the monochromatic version comprises a sepia version of the color image or a grayscale version of the color image.

15. The computer program product of claim 11, wherein the segmentation threshold is determined using Otsu's method, and wherein the machine learning model comprises a conditional random field (CRF).

16. A system of skin-condition visualization, the system comprising:
one or more computer processors; and
a memory containing a program executable by the one or more computer processors to perform an operation comprising:
retrieving a color image depicting facial skin of a subject;
generating a monochromatic version of the color image;
segmenting, based on a segmentation threshold and using a machine learning model, a plurality of candidate instances of one or more skin conditions from the monochromatic version;
generating a polarized version of the color image, wherein based on the polarized version, the plurality of candidate instances is filtered to exclude at least one candidate instance such that one or more candidate instances remain as one or more finalized instances; and
generating, based on the one or more finalized instances, one or more simulation images that simulate an improving or worsening of the one or more finalized instances over time relative to the color image.

17. The system of claim 16, wherein the one or more simulation images are generated based further on at least one of the polarized version, the monochromatic version, and the color image.

18. The system of claim 16, the operation further comprising, prior to determining the segmentation threshold:
filtering the monochromatic version to remove noise.

19. The system of claim 16, wherein the monochromatic version comprises a sepia version of the color image or a grayscale version of the color image.

20. The system of claim 16, wherein the segmentation threshold is determined using Otsu's method, and wherein the machine learning model comprises a conditional random field (CRF).

* * * * *